US009208588B2

(12) United States Patent
Chen et al.

(10) Patent No.: US 9,208,588 B2
(45) Date of Patent: Dec. 8, 2015

(54) FAST STATISTICAL IMAGING RECONSTRUCTION VIA DENOISED ORDERED-SUBSET STATISTICALLY-PENALIZED ALGEBRAIC RECONSTRUCTION TECHNIQUE

(71) Applicant: Wisconsin Alumni Research Foundation, Madison, WI (US)

(72) Inventors: Guang-Hong Chen, Madison, WI (US); Jie Tang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 84 days.

(21) Appl. No.: 14/036,599

(22) Filed: Sep. 25, 2013

(65) Prior Publication Data

US 2015/0086097 A1 Mar. 26, 2015

(51) Int. Cl.
*G06T 11/00* (2006.01)
*G06T 5/00* (2006.01)

(52) U.S. Cl.
CPC ............ *G06T 11/008* (2013.01); *G06T 5/002* (2013.01)

(58) Field of Classification Search
CPC ..... G06T 11/003; G06T 11/006; G06T 5/002; G06T 2211/416; G06T 2211/424
See application file for complete search history.

(56) References Cited

U.S. PATENT DOCUMENTS

| | | | |
|---|---|---|---|
| 4,878,169 A | 10/1989 | Toner et al. | |
| 5,594,767 A | 1/1997 | Hsieh | |
| 6,597,936 B1 | 7/2003 | Liu et al. | |
| 6,841,998 B1 | 1/2005 | Griswold | |
| 7,289,049 B1 | 10/2007 | Fudge et al. | |
| 7,330,027 B2 | 2/2008 | Kozerke et al. | |
| 7,358,730 B2 | 4/2008 | Mistretta et al. | |
| 7,408,347 B2 | 8/2008 | Mistretta et al. | |
| 7,519,412 B2 | 4/2009 | Mistretta | |
| 7,545,901 B2 | 6/2009 | Mistretta | |
| 7,558,414 B2 | 7/2009 | Griswold | |
| 7,646,924 B2 | 1/2010 | Donoho | |
| 7,647,088 B2 | 1/2010 | Mistretta et al. | |
| 2005/0169420 A1 | 8/2005 | Edic et al. | |
| 2007/0010731 A1 | 1/2007 | Mistretta | |
| 2007/0038073 A1 | 2/2007 | Mistretta | |
| 2007/0106149 A1 | 5/2007 | Mistretta | |
| 2007/0156044 A1 | 7/2007 | Mistretta et al. | |
| 2007/0167707 A1 | 7/2007 | Mistretta et al. | |
| 2007/0167728 A1 | 7/2007 | Mistretta et al. | |
| 2007/0167729 A1 | 7/2007 | Mistretta et al. | |

(Continued)

OTHER PUBLICATIONS

Candes, et al., Robust Uncertainty Principles: Exact Signal Reconstruction from Highly Incomplete Frequency Information, IEEE Transactions on Information Theory, 2006, 52(2):489-509.

(Continued)

*Primary Examiner* — Amir Alavi
*Assistant Examiner* — Kenny Cese
(74) *Attorney, Agent, or Firm* — Quarles & Brady, LLP; Jonathan D. Stone

(57) ABSTRACT

Described here are systems and methods for iteratively reconstructing images from data acquired using a medical imaging system. The image reconstruction is decomposed into separate linear sub-problems that can be more efficiently solved. A statistical image reconstruction process is decomposed into a statistically-weighted algebraic reconstruction update sequence. After this step, the reconstructed image is denoised using a regularization function.

19 Claims, 4 Drawing Sheets

(56) References Cited

U.S. PATENT DOCUMENTS

| | | |
|---|---|---|
| 2008/0199063 A1 | 8/2008 | O'Halloran et al. |
| 2008/0219535 A1 | 9/2008 | Mistretta et al. |
| 2009/0076369 A1 | 3/2009 | Mistretta |
| 2009/0129651 A1 | 5/2009 | Zagzebski et al. |
| 2009/0161932 A1 | 6/2009 | Chen |
| 2009/0161933 A1 | 6/2009 | Chen |
| 2009/0175523 A1 | 7/2009 | Chen et al. |
| 2009/0232377 A1 | 9/2009 | Miao et al. |
| 2009/0274355 A1 | 11/2009 | Chen et al. |
| 2010/0183203 A1 | 7/2010 | Ye et al. |
| 2011/0286646 A1* | 11/2011 | Chen et al. ............ 382/131 |
| 2013/0336562 A1* | 12/2013 | Zamyatin et al. ........ 382/131 |
| 2014/0029819 A1* | 1/2014 | Zeng et al. ............. 382/131 |
| 2014/0369581 A1* | 12/2014 | Fu et al. ............... 382/131 |

OTHER PUBLICATIONS

Chen, et al., Prior Image Constrained Compressed Sensing (PICCS), Proc Soc Photo Opt Instrum Eng, 2008, 6856: 685618. doi:10.1117/12.770532.

Chen, et al., Prior Image Constrained Compressed Sensing (PICCS): A Method to Accurately Reconstruct Dynamic CT Images from Highly Undersampled Projection Data Sets, Med. Phys., 2008, 35(2):660-663.

Donoho, Compressed Sensing, Sep. 14, 2004, pp. 1-34.

Donoho, Compressed Sensing, IEEE Transactions on Information Theory, 2006, 52(4):1289-1306.

Fessler, et al., Iterative Image Reconstruction in MRI With Separate Magnitude and Phase Regularization, IEEE International Symposium on Biomedical Imaging: Nano to Macro, 2004, 1:209-212.

Lateur, et al., Resampling MR Signals in Projection Reconstruction MRI, Medical Imaging 2000: Physics of Medical Imaging, Proceedings of SPIE, 2000, 3977:270-279.

Lustig, et al., Rapid MR Imaging with 'Compressed Sensing' and Randomly Under-Sampled 3DFT Trajectories, Proc. Intl. Soc. Mag. Reson. Med., 2006, 14:695.

Lustig, et al., Compressed Sensing MRI, 2007, 18 pages.

Lustig, et al., Sparse MRI: The Application of Compressed Sensing for Rapid MR Imaging, Magnetic Resonance in Medicine, 2007, 58:1182-1195.

Mistretta, et al., Highly Constrained Backprojection for Time-Resolved MRI, Magn Reson Med, 2006, 55(1):30-40.

Nett, et al., Tomosynthesis via Total Variation Minimization Reconstruction and Prior Image Constrained Compressed Sensing (PICCS) on a C-arm System, Proc Soc Photo Opt Instrum Eng, 2008, 6913:nihpa92672. doi:10.1117/12.771294.

O'Halloran, et al., Iterative Projection Reconstruction of Time-Resolved Images Using Highly-Constrained Back-Projection (HYPR), Magnetic Resonance in Medicine, 2008, 59:132-139 (published online Dec. 3, 2007).

Ramani, et al., A Splitting-Based Iterative Algorithm for Accelerated Statistical X-Ray CT Reconstruction, IEEE Trans. Med. Imaging, 2012, 31(3):677-688.

Schmidt, Least Squares Optimization with L1-Norm Regularization, Dec. 2005, pp. 1-12.

Song, et al., Sparseness Prior Based Iterative Image Reconstruction for Retrospectively Gated Cardiac Micro-CT, Med. Phys., 2007, 34(11):4476-4483.

* cited by examiner ically-penalized algebraic reconstruction update sequence with ordered subsets applied on view angles. After this step, the reconstructed image is then denoised using a regularizer.

FAST STATISTICAL IMAGING RECONSTRUCTION VIA DENOISED ORDERED-SUBSET STATISTICALLY-PENALIZED ALGEBRAIC RECONSTRUCTION TECHNIQUE

STATEMENT REGARDING FEDERALLY SPONSORED RESEARCH

This invention was made with government support under EB009699 and CA169331 awarded by the National Institutes of Health. The government has certain rights in the invention.

CROSS-REFERENCE TO RELATED APPLICATIONS

N/A

BACKGROUND OF THE INVENTION

The field of the invention is systems and methods for reconstructing medical images. More particularly, the invention relates to systems and methods for reconstructing medical images using an image reconstruction framework that accounts for statistical noise so as to increase the attainable signal-to-noise ratio in the reconstructed images.

In recent years, statistical imaging reconstruction has been widely introduced by different CT manufacturers into clinics as a vehicle to reduce radiation dose levels. In these methods, an objective function with a statistically weighted data fidelity term and an often highly nonlinear regularization term is minimized to search for a highest quality CT image with lowest noise level to enhance contrast-to-noise ratio to achieve low dose CT imaging. However, a bottleneck to widely use these developed tools for clinical utility is fundamentally impeded by the slow reconstruction speed, often at the order of hours, for reconstruction of a clinical image volume. This is primarily due to the tradeoff between convergence speed and parallelizability of the used optimization techniques. An optimization technique with high convergence speed often has low parallelizability and vice versa.

It would therefore be desirable to provide systems and methods for reconstructing medical images, in which high convergence speeds can be achieved with high parallelizability while reconstructing images with the benefits of statistical reconstruction techniques.

SUMMARY OF THE INVENTION

The present invention overcomes the aforementioned drawbacks by providing a method for reconstructing an image of a subject using a medical imaging system, in which data is acquired using the medical imaging system and the image is reconstructed using an iterative statistical image reconstruction that is decomposed to include in each iteration an image reconstruction step without regularization and a denoising step that includes regularization.

It is another aspect of the invention to provide a method for reconstructing an image of a subject using a medical imaging system, in which data is acquired using the medical imaging system and the image is reconstructed by iteratively minimizing a cost function such that during each iteration an estimate of the image is updated using a step value that is calculated by weighting a derivative of the cost function by a matrix that accounts for noise in the acquired data.

It is yet another aspect of the invention to provide a method for reconstructing an image of a subject. Data is acquired using a medical imaging system and the image is iteratively reconstructed from the acquired data. The image reconstruction includes establishing a cost function to minimize, selecting an estimate of the image, and evaluating the cost function for the estimate. The estimate is updated by adding a step value to the estimate. This step value is calculated by producing synthesized data by applying a system matrix to the estimate, producing difference data by calculating a difference between the synthesized data and the acquired data, producing noise-weighted data by applying a noise-weighting matrix to the difference data, the noise weighting matrix including an estimate of noise, and producing the step value by applying a transpose of the system matrix to the noise-weighted data. A stopping criterion is then evaluated. The updated estimate is stored as the image of the subject when the stopping criterion is satisfied, and when the stopping criterion is not satisfied, the updated estimate is stored as the estimate and the reconstruction steps are repeated.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
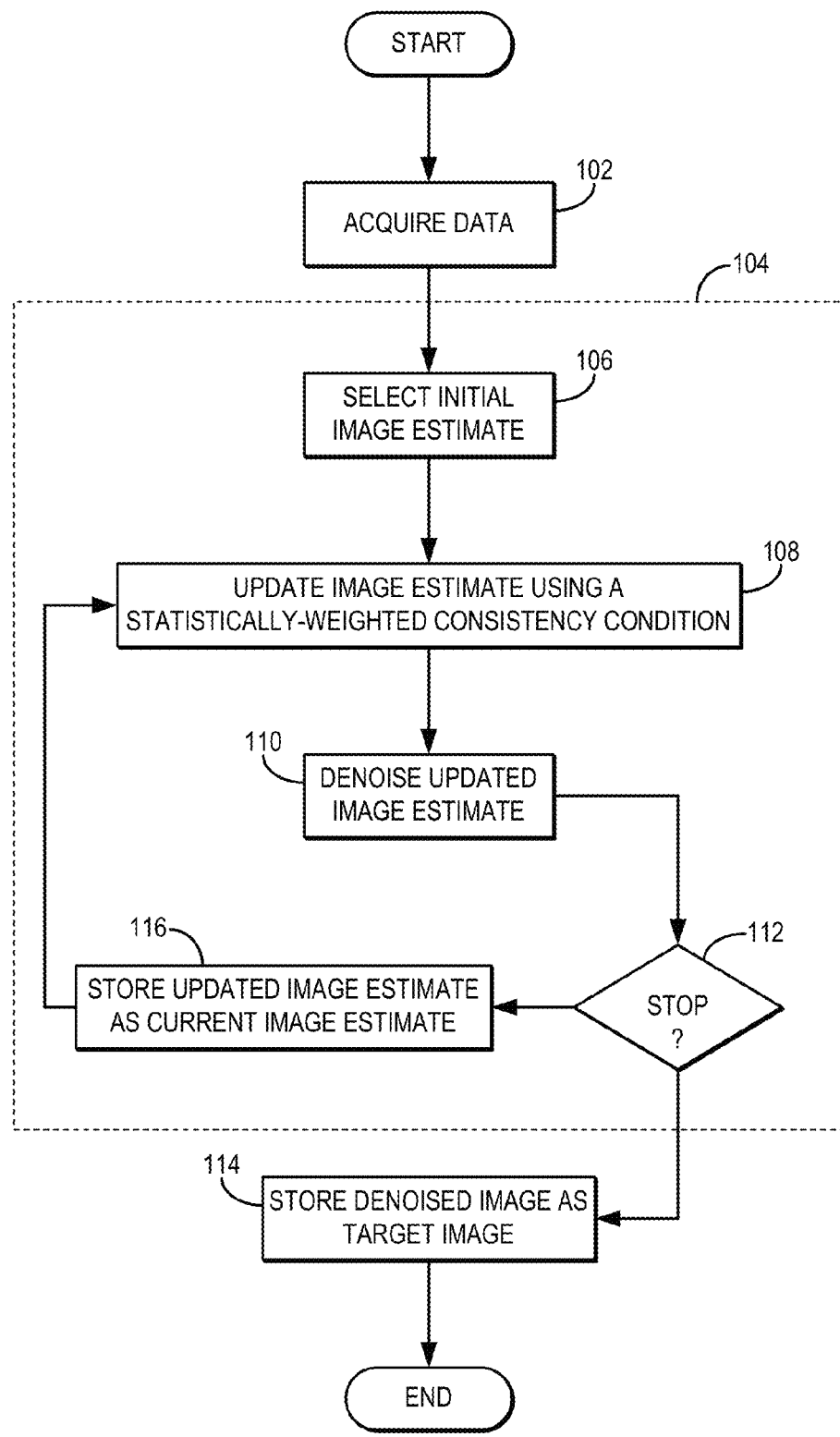
FIG. 1 is a flowchart setting forth the steps of an example of an image reconstruction method that is decomposed into a statistically-weighted update step and a denoising step.

Described here are systems and methods for iteratively reconstructing images from data acquired using a medical imaging system, in which a nonlinear image reconstruction problem is decomposed into linear sub-problems that can be more efficiently solved. As such, both high convergence speed and high parallelizability can be achieved for statistical image reconstruction algorithms. In general, a statistical image reconstruction process is decomposed into a statistically-penalized algebraic reconstruction update sequence with ordered subsets applied on view angles. After this step, the reconstructed image is then denoised using a regularizer.

The systems and methods of the present invention are advantageously suited for medical imaging applications, such as time-resolved computed tomography ("CT"), cone-beam CT, cardiac imaging CT, contrast-enhanced CT, x-ray angiography, magnetic resonance imaging ("MRI"), positron emission tomography ("PET"), single photon emission computed tomography ("SPECT"), optical coherence tomography ("OCT"), and so on. The systems and methods are also advantageously suited for reducing noise in the reconstructed images because the image reconstruction process accounts for noise.

In general, the image reconstruction operates by iteratively minimizing a cost function such that during each iteration, the estimate of the reconstructed image is updated using a step size that is computed using a noise-weighted first derivative of the cost function. An additional denoising step can be implemented at each iteration using a regularization function. This differs from traditional iterative image reconstructions, which incorporate the regularization directly into the cost function, thereby increasing the complexity of the optimization problem. This method, and several examples of its implementation, are described below in detail.

The systems and methods of the present invention make use of transforming a nonlinear optimization problem into a series of consecutive linear optimization problems and noise reduction steps. Using this approach, a high-dimensional optimization problem can be transformed into a separable convex optimization problem that constitutes many sub-problems with significantly reduced dimensions. A purely numerical problem is thereby transformed into a combination of numerical and analytical computations. Moreover, with this approach, a coupled optimization problem with an inseparable system matrix can be transformed into a problem with a separable system matrix, thereby further reducing the dimension of numerical computation. As a consequence, the systems and methods of the present invention can be implemented in a parallelizable manner, which allows for the use of parallelizable computational architectures, such as graphic processor units ("GPUs"), to improve image reconstruction times.

As a non-limiting example, a discussion of iterative reconstruction in the context of x-ray computed tomography ("CT") is now provided. It will be readily appreciated by those skilled in the art, however, that the systems and methods of the present invention are readily adaptable for image reconstruction in other medical imaging modalities, including other x-ray imaging geometries, magnetic resonance imaging ("MRI"), positron emission tomography ("PET"), single photon emission computed tomography ("SPECT"), and so on.

In order to discuss iterative image reconstruction in CT, the physical model of the detection system is first described. The distribution of x-ray attenuation coefficients of an image object is defined as a compactly supported function, $\mu:\Omega\to R$ where $\Omega \subset R^3$ is the spatial support of the object. The x-ray projection measurement vector, y, can be defined as, $y \in R^{N_{proj}}$ with $[y]_i = y_i$ storing a set of line integrals over the lines $\{l_i \subset R^3 : i \in [1, N_{proj}]\}$ such that, $$\bar{y}_i = \int_{l_i \cap \Omega} ds\mu \quad (1).$$

For the purposes of numerical representation, the attenuation coefficient distribution is discretized using basis functions $B_j : R^3 \to R$ describing the voxelized M×N×P image $x \in R^{MNP}$ with $[x]_j = x_j$. The voxel approximation can be written as, $$\mu(r) \approx \sum_{j=1}^{MNP} x_j B_j(x). \quad (2)$$

In this representation, the approximate x-ray projection—typically called forward projection and denoted by the tilde here—becomes, $$\tilde{y}_i \int_{l_i \cap \Omega} ds \sum_{j=1}^{MNP} x_j B_j(x) \quad (3)$$

-continued $$\tilde{y}_i = \sum_{j=1}^{MNP} x_j \int_{l_i \cap \Omega} ds B_j(x)$$

$$\tilde{y}_i = \sum_{j=1}^{MNP} A_{ij} x_j;$$

where $A \in R^{N_{proj} \times MNP}$ with $[A]_{ij} = A_{ij}$ is the so-called "system matrix," which in this instance is the intersection length of the $i^{th}$ line with the $j^{th}$ voxel. Eqn. (3) can thus be rewritten as, $$\tilde{y} = Ax \quad (4).$$

It will be appreciated by those skilled in the art that the system matrix, A, will vary depending on the medical imaging system and modality. For instance, in MRI, the system matrix can represent a Fourier transform that relates k-space data to the image domain.

Following from Eqn. (4), image reconstruction can proceed as follows. First, a cost function (also referred to as an objective function) to be minimized is established or otherwise selected. By way of example, the cost function can be, $$f(x) = \tfrac{1}{2}\|Ax - y\|_D^2 \quad (5);$$

where the weighted norm, $\|Ax-y\|_D^2$, is, $$\|Ax-y\|_D^2 = (Ax-y)^T D(Ax-y) \quad (6);$$

with the diagonal matrix, D, given by, $$D = \text{diag}\left\{\frac{1}{\sigma_1^2}, \frac{1}{\sigma_2^2}, \ldots\right\}; \quad (7)$$

where $\sigma_i^2$ is the noise variance for the $i^{th}$ measured data sample; therefore, the diagonal matrix, D, accounts for noise in the measured data samples by assigning a lower weight to higher noise data and a higher weight to lower noise data. Using the cost function in Eqn. (5), a solution to the image reconstruction problem can be formulated as, $$\tilde{x} = \operatorname*{argmin}_{x} \left\{\frac{1}{2}\|Ax - y\|_D^2\right\}. \quad (8)$$

The cost function can also incorporate a regularization function that that penalizes the roughness of the estimated image. This regularization can decrease the condition number of the image reconstruction problem and, therefore, can speed convergence. By way of example, the cost function of Eqn. (5) can be modified to incorporate a regularization function as follows:

$$f(x) = \tfrac{1}{2}\|Ax - y\|_D^2 + \lambda R(x) \quad (9);$$

where R(X) is a regularization function and is a regularization parameter that selectively scales the influence of the regularization function. The regularization function can be selected as any number of different functions, including a total variation ("TV") function, an absolute value function, a quadratic function, a general power function, an indicator function, a Huber function, a q-generalized Gaussian Markov random field ("q-GGMRF") function, a Fair potential, and a prior image-constrained compressed sensing ("PICCS") function, such as, $$R(x) = \alpha\|\Psi_1(x - x_P)\|_1 + (1-\alpha)\|\Psi_2 x\| \quad (10).$$

To solve the image reconstruction problem in Eqn. (9), the derivative (e.g., the gradient) of the data fidelity term and of the prior term both need to be calculated. However, these two terms operate in different spaces: the data fidelity term operates in projection data space while the prior term operates image space. Therefore, the contributions from the two terms often have dramatically different amplitudes, in which case the regularization parameter, λ, is used to balance the contributions from each term. As will now be described in detail, it is a discovery of the inventors that these two terms can be separately optimized, thereby providing a mathematically rigorous procedure to make the optimization of the two terms independent while still guaranteeing convergence.

Using the cost function in Eqn. (9), the image reconstruction problem can be formulated as, $$\tilde{x} = \arg\min_{x}\left\{\frac{1}{2}\|Ax - y\|_D^2 + \lambda R(x)\right\}; \quad (11)$$

which can be recast as, $$\arg\min_{x}\{g_1(x) + g_2(x)\}; \quad (12)$$

where $g_1(x)$ and $g_2(x)$ are convex functions defined as, $$g_1(x) = \frac{1}{2}\|Ax-y\|_D^2 = (Ax-y)^T D(Ax-y) \quad (13);$$

$$g_2(x) = \lambda R(x) \quad (14).$$

The optimality condition for the image reconstruction problem in Eqn. (11) thus becomes, $$\partial g_2(x) = -\nabla g_1(x) \quad (15)$$
$$= (x - \nabla g_1(x)) - x.$$

Using a proximity operator technique, a fixed point equation of the following form can derived from Eqn. (15):

$$x_{k+1} = P_{g_2}(x_k - \nabla g_1(x_k)) \quad (16);$$

where $P_{g_2}(z)$ is a proximity operator of an arbitrary vector, z, to the convex function, $g_2(x)$. Generally speaking, the proximity operator $P_{g_2}(z)$ defines the shortest distance from a point the vector, z, to the domain of the convex function, $g_2(x)$. For instance, the proximity operator may have the form, $$P_{g_2}(z) = \arg\min_{x}\left\{g_2(x) + \frac{1}{2}\|z - x\|^2\right\}. \quad (17)$$

During each iteration, the image estimate is updated using a step value that incorporates the noise statistics in a noise matrix, D. By way of example, the step value, $\Delta x_n$, for the image estimate computed in the $n^{th}$ iteration of the minimization can be, $$\Delta x_n = \omega A^T D(Ax_n - y) \quad (18)$$

where ω is a weighting value, A is the system matrix described above, $A^T$ is the transpose of the system matrix, D is the noise matrix, $x_n$ is the image estimate computed in the $n^{th}$ iteration of the minimization, and y is the acquired data. The weighting value can be a single numerical factor or a numerical matrix. Preferably, the weighting value satisfies certain mathematical conditions, such as being positive definite, to ensure convergence of the update sequence. In one example, the weighting value can simply be set to one, ω=1.

The update sequence in Eqn. (18) provides significant flexibility in practice. For instance, a single increment, $\Delta x_n$, can be calculated from all of the measured projection data, or the increment, $\Delta x_n$, can be calculated from a subgroup of the measured projection data. Preferably, when the increment, $\Delta x_n$, is calculated from different subgroups, the subgroups are selected such that the union of all the subgroups covers all of the measured data. When each individual subgroup of projection data is used to calculate the increment, $\Delta x_n$, one rough estimate of the image object is generated. Each subsequent increment, $\Delta x_n$, is calculated from the next subgroup of projection data, and the initial image in that estimation is set to be the final image that incorporated the contributions from the previous subgroups of projection data. In this way, after accounting for all contributions from the entire projection data set, an improved estimate of the image can be generated, but with significantly accelerated speed. This flexibility in data partitioning and in calculating the contributions from sequential subgroups of the measured data can be been referred to as an "ordered-subset" method. Conventional statistical image reconstruction method that directly incorporate regularization into the numerical optimization procedure are incompatible with the ordered-subset approach, thereby limiting the flexibilities offered by that data partitioning scheme. The other advantage of using ordered subsets is to significantly reduce the dimensionality of the effective system matrix, A, and thus reduce the computational complexity of the problem.

Using the aforementioned techniques, a general image reconstruction method can be provided as follows. Referring now to FIG. 1, a method for reconstructing an image using a two step iterative procedure that accounts for reconstruction in one step and denoising in a second step is illustrated. The method begins with the acquisition of data using a medical imaging system, as indicated at step 102. The medical imaging system may include, for example, a computed tomography ("CT") system, a cone-beam CT system, a C-arm x-ray system, a magnetic resonance imaging ("MRI") system, a positron emission tomography ("PET") system, a single photon emission computed tomography ("SPECT") system, an optical coherence tomography ("OCT") system, and so on.

Figure 2:
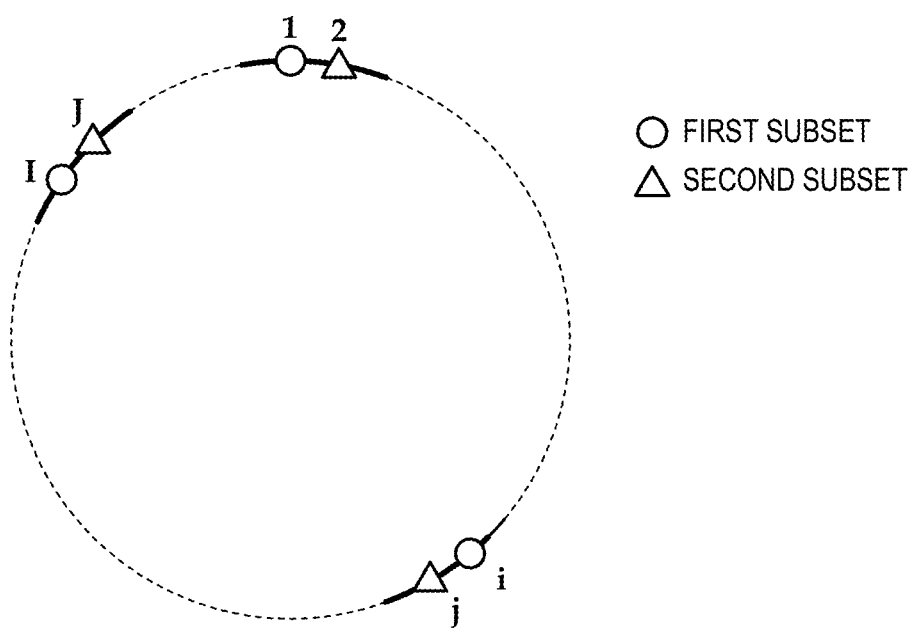
FIG. 2 is an illustrative example of ordered subsets of tomographic data.

From this acquired data, a target image of the underlying object is reconstructed, as generally indicated at 104. The image reconstruction process can be viewed as one in which the image reconstruction is decomposed into two distinct steps: a statistical image reconstruction step without regularization, and a denoising step that includes regularization. As described above, image reconstruction may be performed using ordered subsets of data. For instance, ordered subsets of view angles can be used in tomographic imaging applications. An example of such ordered subsets is illustrated in FIG. 2, in which a two subsets of the N total acquired view angles are shown. These subsets include I<N and J<N view angles that are uniformly distributed within each subset and over the range of acquired view angles; however, other arrangements of view angles can also be implemented. By operating on ordered subsets rather than local groupings of view angles, global information can be utilized during the image reconstruction process.

First, an initial estimate of the target image is selected, as indicated at step 106. Any suitable estimate can be selected, including an appropriately sized empty image matrix, with the choice of initial estimate influencing the convergence speed of the image reconstruction process.

The initial estimate is then updated using a step size that is computed using a statistically-weighted consistency condition, as indicated at step 108. This step may include the following. A cost function to be minimized can be selected and evaluated for the estimate image. The step size can then be computed and added to the value returned by the cost function. Generally, the step size is computed as a statistically-weighted consistency condition. In some embodiments, this step size can be computed by weighting a derivative of the cost function by a matrix that accounts for noise in the acquired data. Examples of these processes are provided above, but may include producing synthesized data by applying a system matrix to the estimate image, producing difference data by calculating a difference between the synthesized data and the acquired data, producing noise-weighted data by applying a noise-weighting matrix to the difference data, and producing the step value by applying a transpose of the system matrix to the noise-weighted data.

The updated estimate image is then denoised, as indicated at step 110. This denoising step includes a regularization term, while the image reconstruction step did not. As an example, the updated estimate image can be denoised according to the following:

$$\hat{x}_{n+1} = \frac{1}{2}(x_{n+1} - x_n)^2 + \lambda R(x_{n+1}) \quad (19);$$

where $x_{n+1}$ is the updated estimate image, $x_n$ is the estimate image provided in step 108, $\lambda$ is a regularization parameter, $R(X_{n+1})$ indicates the application of a regularization function to the estimate image, and $\hat{x}i_{n+1}$ is the denoised image. The regularization function can be selected as one of any number of different functions, including a total variation function, an absolute value function, a quadratic function, a general power function, an indicator function, a Huber function, a q-GGMRF function, a Fair potential, and a PICCS function, such as the one in Eqn. (10) above.

After the updated estimate image is denoised, a stopping criterion is evaluated at step 112 to determine whether additional iterations of the image reconstruction are warranted or otherwise desired. If the stopping criterion is satisfied, then the denoised image is stored as the target image at step 114; otherwise, the denoised image is stored as the estimate image at step 116 and the image reconstruction process proceeds for another iteration at step 108.

Having described the image reconstruction method of the present invention, an example of how it can be utilized to further improve the signal-to-noise ratio of the target image is provided. Reduction of radiation dose in CT has been a focus of the recent CT technology development. There are many different strategies that have been developed to achieve this goal. One major category of the methods is to introduce statistical modeling of the data into reconstruction, as described above. In the second category of method, one major challenge has been the residual streaking artifacts that are caused by photon starvation when radiation dose is lowered. The method of the present invention can be utilized to overcome these technical challenges.

In an example of this method, a source image for a low-pass filter is generated using the iterative reconstruction procedure described above. After this source image is low-pass filtered to generate a prior image, the prior image is either directly blended with an unfiltered image to generate a final image, or the prior image is used together with the synthesized data in a PICCS reconstruction algorithm to reconstruct a low noise image with preserved spatial resolution. Either way, the generated low noise image is linearly combined with the source image to generate the final image. As a result, the noise distribution is homogenized by the iterative reconstruction procedure to improve the homogeneity of image quality, especially to improve the low contrast detectability of the image. The images may be combined as follows:

$$x = \omega x_1 + (1-\omega) x_2 \quad (20);$$

where x is the target image in which image quality is homogenized and SNR improved without degrading spatial resolution; $x_1$ is an image reconstructed using the iterative image reconstruction method of the present invention, described above; $x_2$ is either the prior image (e.g., the low-pass filtered version of $x_1$) or an image reconstructed using a PICCS image reconstruction method; and $\omega$ is a weighting parameter, which may include a diagonal matrix of weighting parameters.

Figure 3A:
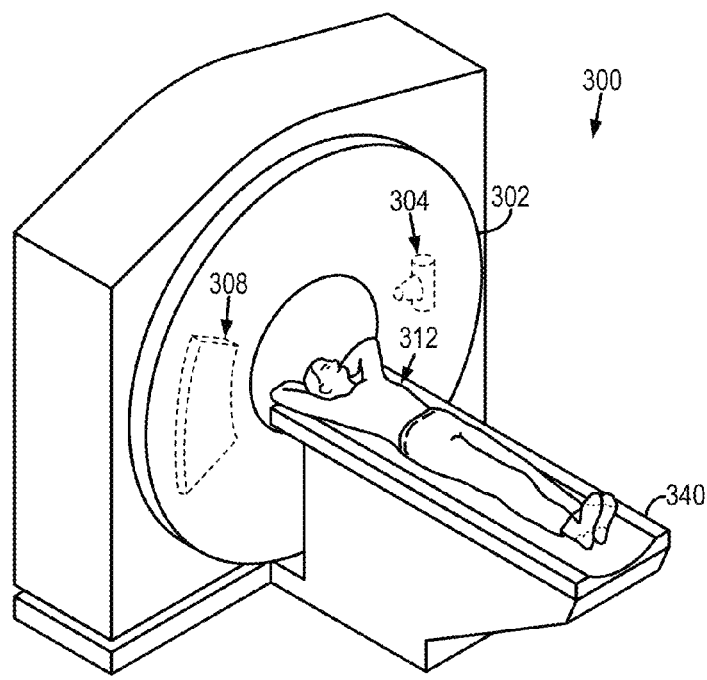
FIG. 3A is an example of an x-ray computed tomography ("CT") system.
Figure 3B:
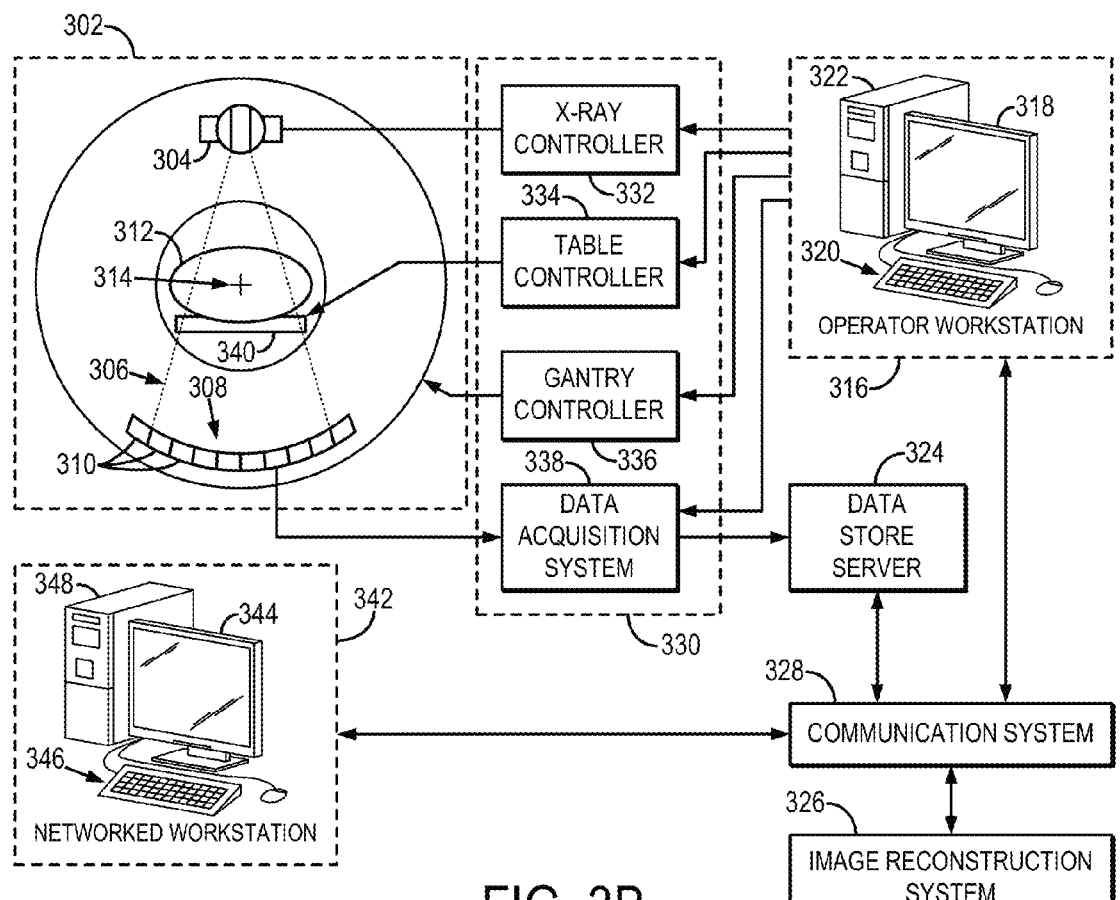
FIG. 3B is an example of a block diagram of the x-ray CT system of FIG. 3A.

Referring particularly now to FIGS. 3A and 3B, an example of an x-ray computed tomography ("CT") imaging system 300 is illustrated. The CT system includes a gantry 302, to which at least one x-ray source 304 is coupled. The x-ray source 304 projects an x-ray beam 306, which may be a fan-beam or cone-beam of x-rays, towards a detector array 308 on the opposite side of the gantry 302. The detector array 308 includes a number of x-ray detector elements 310. Together, the x-ray detector elements 310 sense the projected x-rays 306 that pass through a subject 312, such as a medical patient or an object undergoing examination, that is positioned in the CT system 300. Each x-ray detector element 310 produces an electrical signal that may represent the intensity of an impinging x-ray beam and, hence, the attenuation of the beam as it passes through the subject 312. In some configurations, each x-ray detector 310 is capable of counting the number of x-ray photons that impinge upon the detector 310. During a scan to acquire x-ray projection data, the gantry 302 and the components mounted thereon rotate about a center of rotation 314 located within the CT system 300.

The CT system 300 also includes an operator workstation 316, which typically includes a display 318; one or more input devices 320, such as a keyboard and mouse; and a computer processor 322. The computer processor 322 may include a commercially available programmable machine running a commercially available operating system. The operator workstation 316 provides the operator interface that enables scanning control parameters to be entered into the CT system 300. In general, the operator workstation 316 is in communication with a data store server 324 and an image reconstruction system 326. By way of example, the operator workstation 316, data store sever 324, and image reconstruction system 326 may be connected via a communication system 328, which may include any suitable network connection, whether wired, wireless, or a combination of both. As an example, the communication system 328 may include both proprietary or dedicated networks, as well as open networks, such as the internet.

The operator workstation 316 is also in communication with a control system 330 that controls operation of the CT system 300. The control system 330 generally includes an x-ray controller 332, a table controller 334, a gantry controller 336, and a data acquisition system 338. The x-ray controller 332 provides power and timing signals to the x-ray source 304 and the gantry controller 336 controls the rotational speed and position of the gantry 302. The table controller 334 controls a table 340 to position the subject 312 in the gantry 302 of the CT system 300.

The DAS 338 samples data from the detector elements 310 and converts the data to digital signals for subsequent processing. For instance, digitized x-ray data is communicated from the DAS 338 to the data store server 324. The image reconstruction system 326 then retrieves the x-ray data from the data store server 324 and reconstructs an image therefrom. The image reconstruction system 326 may include a commercially available computer processor, or may be a highly parallel computer architecture, such as a system that includes multiple-core processors and massively parallel, high-density computing devices. Optionally, image reconstruction can also be performed on the processor 322 in the operator workstation 316. Reconstructed images can then be communicated back to the data store server 324 for storage or to the operator workstation 316 to be displayed to the operator or clinician.

The CT system 300 may also include one or more networked workstations 342. By way of example, a networked workstation 342 may include a display 344; one or more input devices 346, such as a keyboard and mouse; and a processor 348. The networked workstation 342 may be located within the same facility as the operator workstation 316, or in a different facility, such as a different healthcare institution or clinic.

The networked workstation 342, whether within the same facility or in a different facility as the operator workstation 316, may gain remote access to the data store server 324 and/or the image reconstruction system 326 via the communication system 328. Accordingly, multiple networked workstations 342 may have access to the data store server 324 and/or image reconstruction system 326. In this manner, x-ray data, reconstructed images, or other data may exchanged between the data store server 324, the image reconstruction system 326, and the networked workstations 342, such that the data or images may be remotely processed by a networked workstation 342. This data may be exchanged in any suitable format, such as in accordance with the transmission control protocol ("TCP"), the internet protocol ("IP"), or other known or suitable protocols.

Figure 4:
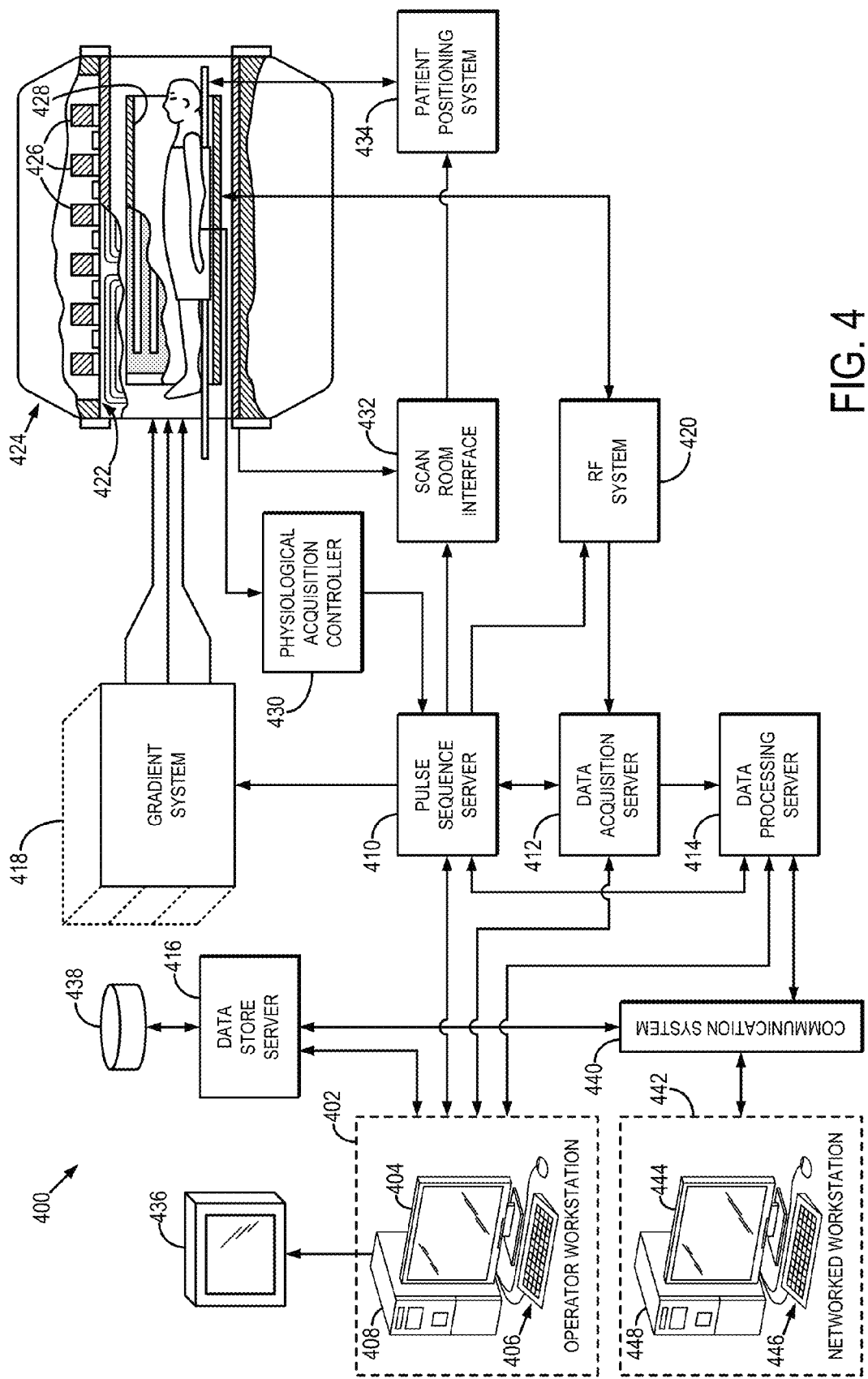
FIG. 4 is a block diagram of an example of a magnetic resonance imaging ("MRI") system.

Referring particularly now to FIG. 4, an example of a magnetic resonance imaging ("MRI") system 400 is illustrated. The MRI system 400 includes an operator workstation 402, which will typically include a display 404; one or more input devices 406, such as a keyboard and mouse; and a processor 408. The processor 408 may include a commercially available programmable machine running a commercially available operating system. The operator workstation 402 provides the operator interface that enables scan prescriptions to be entered into the MRI system 400. In general, the operator workstation 402 may be coupled to four servers: a pulse sequence server 410; a data acquisition server 412; a data processing server 414; and a data store server 416. The operator workstation 402 and each server 410, 412, 414, and 416 are connected to communicate with each other. For example, the servers 410, 412, 414, and 416 may be connected via a communication system 440, which may include any suitable network connection, whether wired, wireless, or a combination of both. As an example, the communication system 440 may include both proprietary or dedicated networks, as well as open networks, such as the internet.

The pulse sequence server 410 functions in response to instructions downloaded from the operator workstation 402 to operate a gradient system 418 and a radiofrequency ("RF") system 420. Gradient waveforms necessary to perform the prescribed scan are produced and applied to the gradient system 418, which excites gradient coils in an assembly 422 to produce the magnetic field gradients $G_x$, $G_y$, and $G_z$ used for position encoding magnetic resonance signals. The gradient coil assembly 422 forms part of a magnet assembly 424 that includes a polarizing magnet 426 and a whole-body RF coil 428.

RF waveforms are applied by the RF system 420 to the RF coil 428, or a separate local coil (not shown in FIG. 4), in order to perform the prescribed magnetic resonance pulse sequence. Responsive magnetic resonance signals detected by the RF coil 428, or a separate local coil (not shown in FIG. 4), are received by the RF system 420, where they are amplified, demodulated, filtered, and digitized under direction of commands produced by the pulse sequence server 410. The RF system 420 includes an RF transmitter for producing a wide variety of RF pulses used in MRI pulse sequences. The RF transmitter is responsive to the scan prescription and direction from the pulse sequence server 410 to produce RF pulses of the desired frequency, phase, and pulse amplitude waveform. The generated RF pulses may be applied to the whole-body RF coil 428 or to one or more local coils or coil arrays (not shown in FIG. 4).

The RF system 420 also includes one or more RF receiver channels. Each RF receiver channel includes an RF preamplifier that amplifies the magnetic resonance signal received by the coil 428 to which it is connected, and a detector that detects and digitizes the I and Q quadrature components of the received magnetic resonance signal. The magnitude of the received magnetic resonance signal may, therefore, be determined at any sampled point by the square root of the sum of the squares of the I and Q components:

$$M = \sqrt{I^2 + Q^2} \tag{21};$$

and the phase of the received magnetic resonance signal may also be determined according to the following relationship:

$$\varphi = \tan^{-1}\left(\frac{Q}{I}\right). \tag{22}$$

The pulse sequence server 410 also optionally receives patient data from a physiological acquisition controller 430. By way of example, the physiological acquisition controller 430 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 410 to synchronize, or "gate," the performance of the scan with the subject's heart beat or respiration.

The pulse sequence server 410 also connects to a scan room interface circuit 432 that receives signals from various sensors associated with the condition of the patient and the magnet system. It is also through the scan room interface circuit 432 that a patient positioning system 434 receives commands to move the patient to desired positions during the scan.

The digitized magnetic resonance signal samples produced by the RF system 420 are received by the data acquisition server 412. The data acquisition server 412 operates in response to instructions downloaded from the operator workstation 402 to receive the real-time magnetic resonance data and provide buffer storage, such that no data is lost by data overrun. In some scans, the data acquisition server 412 does little more than pass the acquired magnetic resonance data to the data processor server 414. However, in scans that require information derived from acquired magnetic resonance data to control the further performance of the scan, the data acquisition server 412 is programmed to produce such information and convey it to the pulse sequence server 410. For example, during prescans, magnetic resonance data is acquired and used to calibrate the pulse sequence performed by the pulse sequence server 410. As another example, navigator signals may be acquired and used to adjust the operating parameters of the RF system 420 or the gradient system 418, or to control the view order in which k-space is sampled. In still another example, the data acquisition server 412 may also be employed to process magnetic resonance signals used to detect the arrival of a contrast agent in a magnetic resonance angiography ("MRA") scan. By way of example, the data acquisition server 412 acquires magnetic resonance data and processes it in real-time to produce information that is used to control the scan.

The data processing server 414 receives magnetic resonance data from the data acquisition server 412 and processes it in accordance with instructions downloaded from the operator workstation 402. Such processing may, for example, include one or more of the following: reconstructing two-dimensional or three-dimensional images by performing a Fourier transformation of raw k-space data; performing other image reconstruction algorithms, such as iterative or back-projection reconstruction algorithms; applying filters to raw k-space data or to reconstructed images; generating functional magnetic resonance images; calculating motion or flow images; and so on.

Images reconstructed by the data processing server 414 are conveyed back to the operator workstation 402 where they are stored. Real-time images are stored in a data base memory cache (not shown in FIG. 4), from which they may be output to operator display 412 or a display 436 that is located near the magnet assembly 424 for use by attending physicians. Batch mode images or selected real time images are stored in a host database on disc storage 438. When such images have been reconstructed and transferred to storage, the data processing server 414 notifies the data store server 416 on the operator workstation 402. The operator workstation 402 may be used by an operator to archive the images, produce films, or send the images via a network to other facilities.

The MRI system 400 may also include one or more networked workstations 442. By way of example, a networked workstation 442 may include a display 444; one or more input devices 446, such as a keyboard and mouse; and a processor 448. The networked workstation 442 may be located within the same facility as the operator workstation 402, or in a different facility, such as a different healthcare institution or clinic.

The networked workstation 442, whether within the same facility or in a different facility as the operator workstation 402, may gain remote access to the data processing server 414 or data store server 416 via the communication system 440. Accordingly, multiple networked workstations 442 may have access to the data processing server 414 and the data store server 416. In this manner, magnetic resonance data, reconstructed images, or other data may exchanged between the data processing server 414 or the data store server 416 and the networked workstations 442, such that the data or images may be remotely processed by a networked workstation 442. This data may be exchanged in any suitable format, such as in accordance with the transmission control protocol ("TCP"), the internet protocol ("IP"), or other known or suitable protocols.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for reconstructing an image of a subject using a medical imaging system, the steps of the method comprising:

a) acquiring data from the subject using the medical imaging system;
　b) reconstructing an image of the subject from the acquired data using an iterative statistical image reconstruction that is decomposed to include in each iteration an image reconstruction step without regularization and a denoising step that includes regularization.

2. The method as recited in claim 1, wherein the image reconstruction step includes establishing a cost function to minimize, selecting an estimate of the image, evaluating the cost function for the estimate, and producing an updated estimate by adding a step value to the estimate.

3. The method as recited in claim 2, wherein the step value is calculated by:
　producing synthesized data by applying a system matrix to the estimate;
　producing difference data by calculating a difference between the synthesized data and the acquired data;
　producing noise-weighted data by applying a noise-weighting matrix to the difference data, the noise weighting matrix including an estimate of noise; and
　producing the step value by applying a transpose of the system matrix to the noise-weighted data.

4. The method as recited in claim 1, wherein the denoising step includes using a regularizer to denoise the image reconstructed in the image reconstruction step.

5. The method as recited in claim 4, wherein the regularizer is at least one of a total variation function, an absolute value function, a quadratic function, a general power function, an indicator function, a Huber function, a q-GGMRF function, and a Fair potential.

6. The method as recited in claim 4, wherein the regularizer is a PICCS function that includes a term that sparsifies the image using a prior image of the subject.

7. The method as recited in claim 1, further comprising homogenizing noise in the image reconstructed in step b) by:
　i) forming a denoised image by denoising the image reconstructed in step b);
　ii) combining the denoised image and the image reconstructed in step b).

8. The method as recited in claim 7, wherein combining the denoised image and the image reconstructed in step b) further includes performing a weighted combination.

9. The method as recited in claim 7, wherein forming the denoised image includes applying a low-pass filter to the image reconstructed in step b).

10. The method as recited in claim 7, wherein forming the denoised image further includes selecting the denoised image as a prior image and updating the denoised image using an iterative minimization that includes a term that sparsifies an estimate of the updated denoised image using the prior image.

11. The method as recited in claim 1, wherein step b) includes reconstructing the image of the subject from ordered subsets of the data acquired in step a).

12. The method as recited in claim 11, wherein the medical imaging system comprises a tomographic medical imaging system and step b) includes reconstructing the image of the subject from ordered subsets of acquired data that are ordered by view angles.

13. The method as recited in claim 12, wherein a union of the ordered subsets of acquired data encompasses the data acquired in step a).

14. A method for reconstructing an image of a subject using a medical imaging system, the steps of the method comprising:
　a) acquiring data from the subject using the medical imaging system;

b) reconstructing an image of the subject from the acquired data by iteratively minimizing a cost function such that during each iteration an estimate of the image is updated using a step value that is calculated by weighting a derivative of the cost function by a matrix that accounts for noise in the acquired data.

15. The method as recited in claim 14, wherein the matrix that accounts for noise in the acquired data is a diagonal matrix that includes values based on noise variances of the acquired data.

16. The method as recited in claim 15, wherein the diagonal matrix includes values that are inverses of the noise variances of the acquired data.

17. The method as recited in claim 14, wherein the cost function minimized in step b) computes a sum-of-squares of differences between the acquired data and a forward projection of an estimate of the image to be reconstructed.

18. The method as recited in claim 14, wherein step b) includes reconstructing the image of the subject from ordered subsets of the data acquired in step a).

19. A method for reconstructing an image of a subject, the steps of the method comprising:
    acquiring data from a subject using a medical imaging system; and
    iteratively reconstructing an image of the subject from the acquired data by:
    i) establishing a cost function to minimize;
    ii) selecting an estimate of the image;
    iii) evaluating the cost function for the estimate;
    iv) producing an updated estimate by adding a step value to the estimate, the step value being calculated by:
        producing synthesized data by applying a system matrix to the estimate;
        producing difference data by calculating a difference between the synthesized data and the acquired data;
        producing noise-weighted data by applying a noise-weighting matrix to the difference data, the noise weighting matrix including an estimate of noise;
        producing the step value by applying a transpose of the system matrix to the noise-weighted data;
    v) evaluating a stopping criterion; and
    vi) storing the updated estimate as the image of the subject when the stopping criterion is satisfied and when the stopping criterion is not satisfied, storing the updated estimate as the estimate and repeating steps iii)-v).

* * * * *